Figure 1:
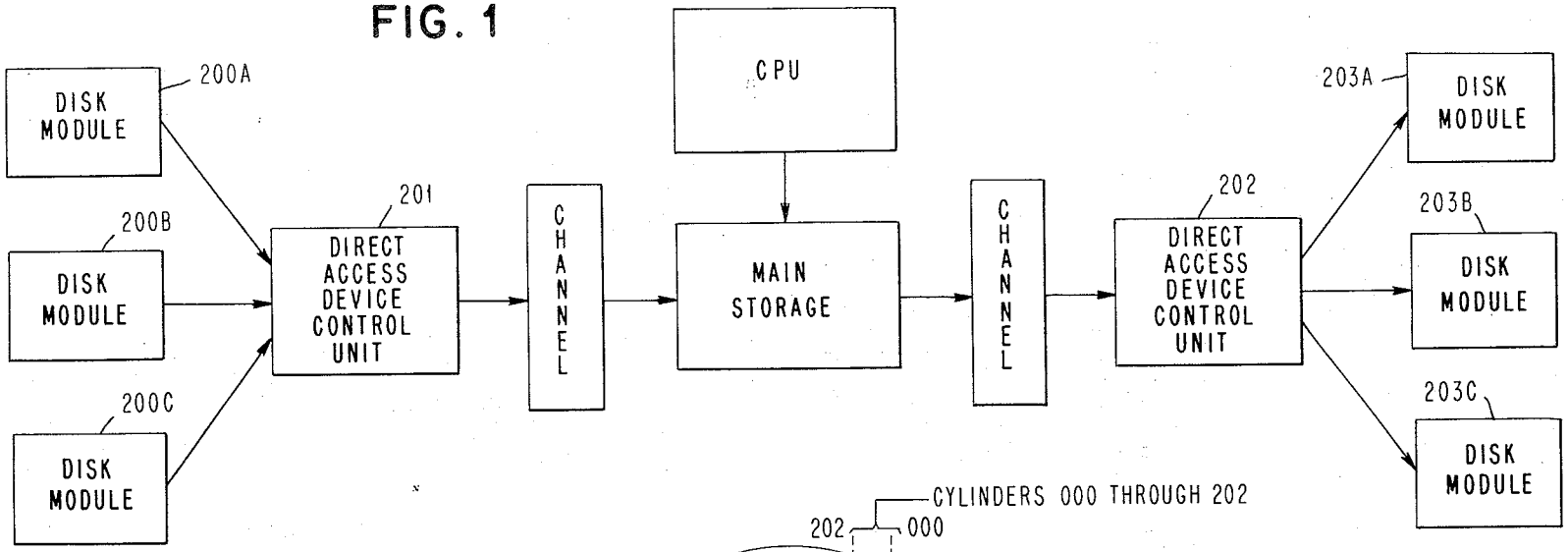
Figure 2:
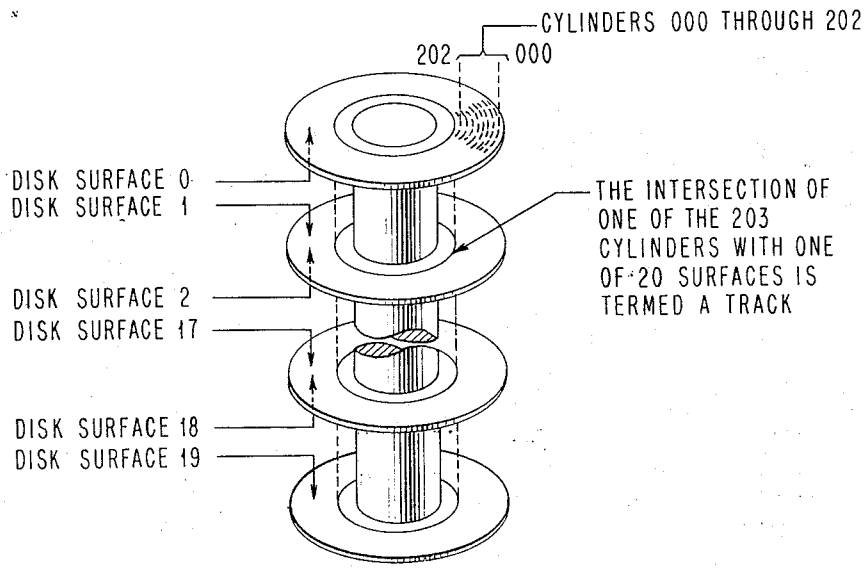
Figure 3:
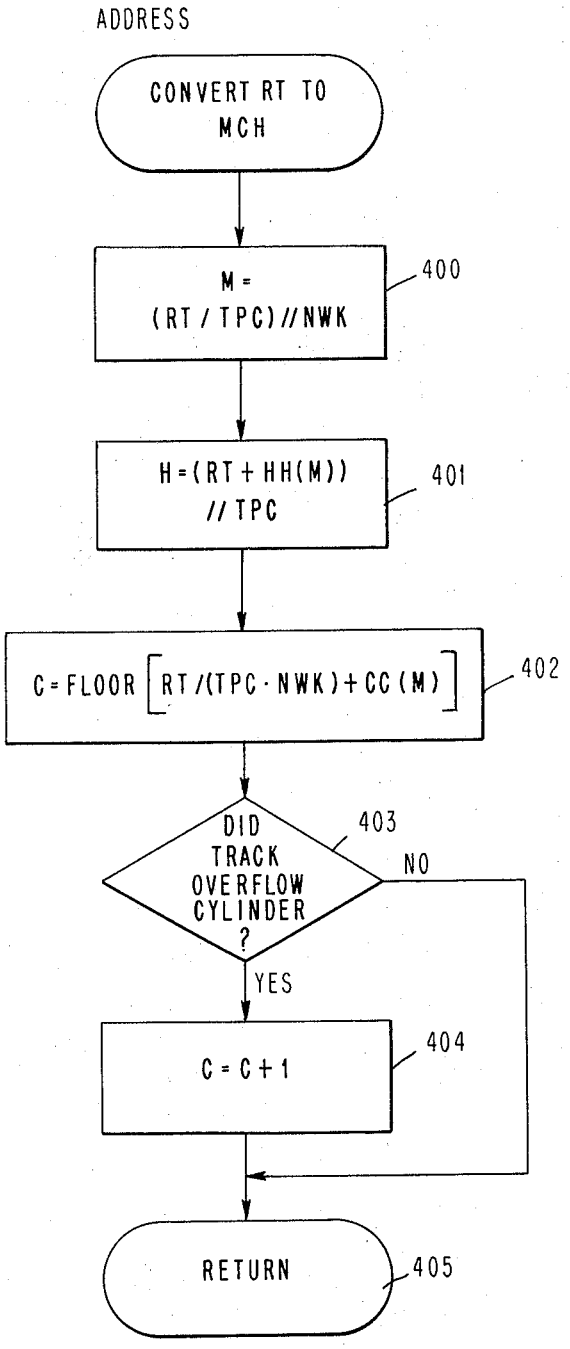
Figure 4:
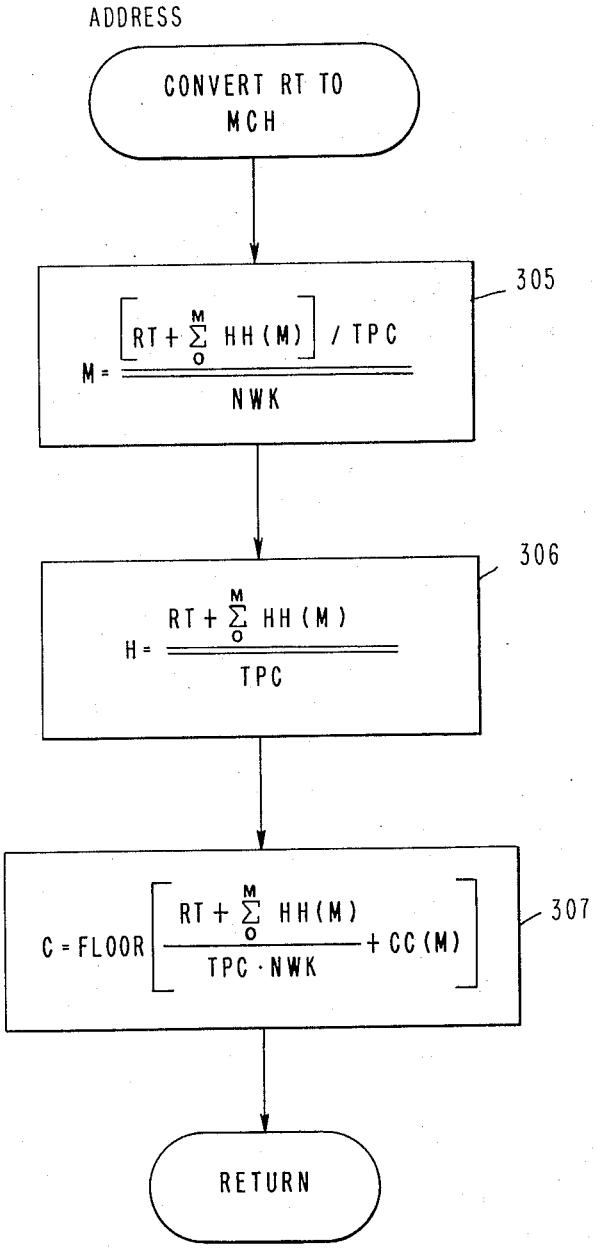
Figures 6, 7, 8:
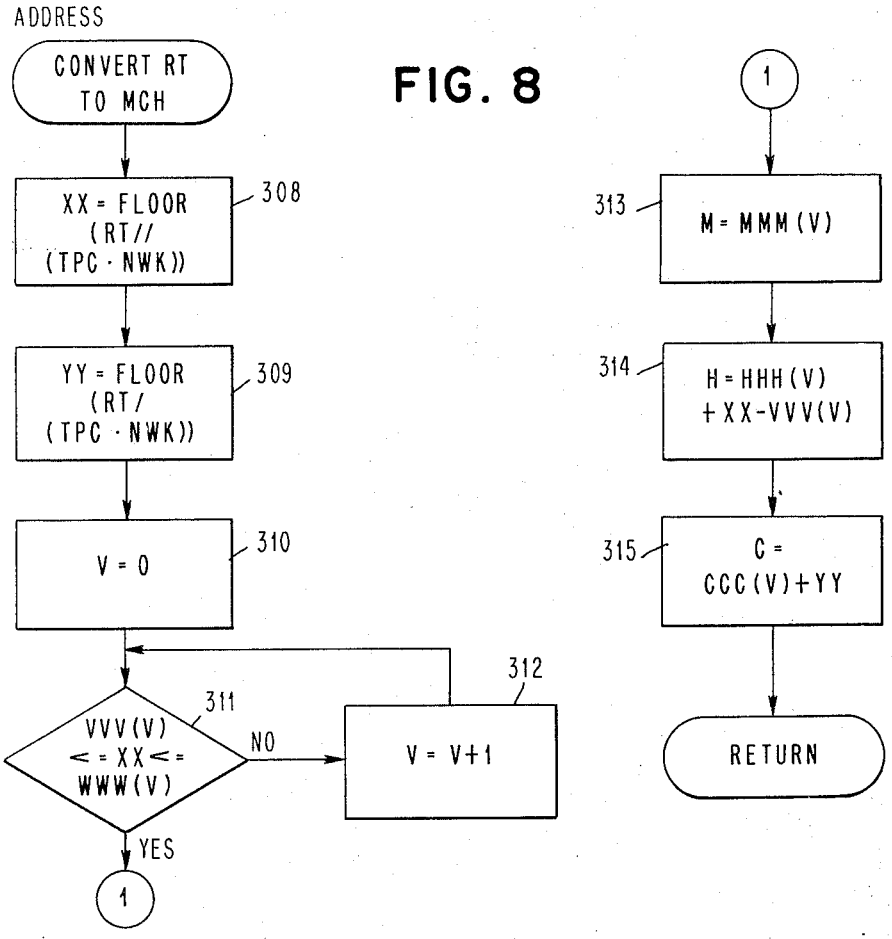

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction, may be purchased for 30 cents a sheet.

Defensive Publication applications have not been examined as to the merits of alleged invention. The Patent Office makes no assertion as to the novelty of the disclosed subject matter.

PUBLISHED JULY 2, 1974

924 O.G. 7

T924,005

FILE ORGANIZATION ON DIRECT ACCESS DISK DEVICE

Leslie S. Coleman, Jr., Poughkeepsie, N.Y., assignor to International Business Machines Corporation, Armonk, N.Y.

Continuation of application Ser. No. 199,692, Nov. 17, 1971. This application Oct. 2, 1973, Ser. No. 402,694

Int. Cl. G06f *9/06, 13/04*

U.S. Cl. 340—172.5

5 Sheets Drawing. 20 Pages Specification

A technique is disclosed for utilizing all available work space on direct access disk devices without regard to the actual physical location of the work space by providing a logical address naming convention for available work space and an automatic translation of physical address to

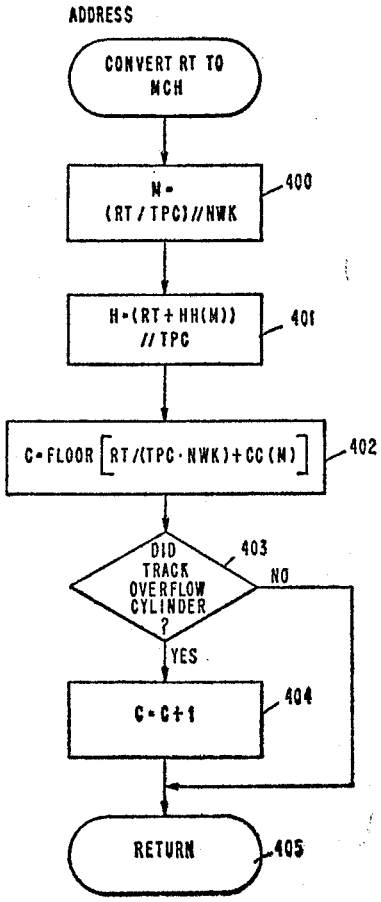

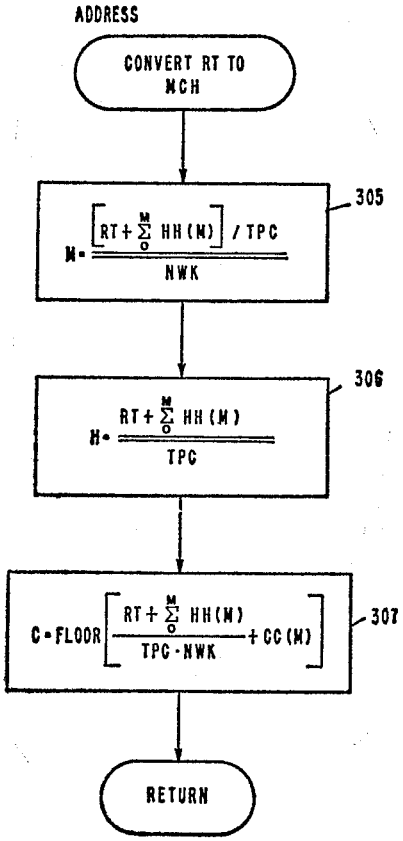

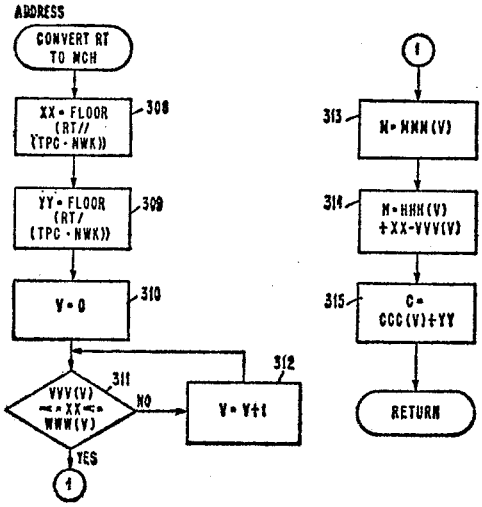

logical address. The translation is automatically machine calculated according to $$M=MMM(V)$$
$$H=HHH(V)+XX-VVV(V)$$
$$C=CCC(V)+YY$$
$$XX=FLOOR(RT//(TPC\cdot NWK))$$
$$YY=FLOOR(RT/(TPC\cdot NWK))$$

where M is the physical module number, H is the physical track (head) number, C is the physical cylinder number, MMM, HHH, and CCC are physical module, head and cylinder numbers at predetermined break points selected by the user, XX and YY are parameters, and X is a parameter equal to the lowest possible value of V at which $VVV(V) \leq XX \leq WWW(V)$ where VVV is equal to the first logical track of a group and WWW is equal to the last logical track of that group, a group comprising all logical tracks between two of the predetermined break points, and where a break point is the transfer from one physical cylinder to another physical cylinder.

A track interleaving technique is also disclosed for combination with the work space technique to achieve rapid comparison of parallel files.

FILE ORGANIZATION ON DIRECT ACCESS DISK DEVICE

Original Filed Nov. 17, 1971 5 Sheets-Sheet 1

FIG. 5

HH(0) = 5 CC(0) = 2 TPC = 20
HH(1) = 10 CC(1) = 5 NWK = 3
HH(2) = 4 CC(2) = 1 TPC · NWK = 60

| | RT | M | C | H |
|---|---|---|---|---|
| 15B | 0 | 0 | 2 | 5 |
| 15A | 0 | 0 | 2 | 5 |
| 15B | 1 | | | 6 |
| 15A | 1 | | | 6 |
| 15B | 2 | | | 7 |
| 15A | 2 | | | 7 |
| | 3 | | | 8 |
| | 3 | | | 8 |
| | 4 | | | 9 |
| | 4 | | | 9 |
| | 5 | | | 10 |
| | 5 | | | 10 |
| | 6 | | | 11 |
| | 6 | | | 11 |
| | 7 | | | 12 |
| | 7 | | | 12 |
| | 8 | | | 13 |
| | 8 | | | 13 |
| | 9 | | | 14 |
| | 9 | | | 14 |
| | 10 | | | 15 |
| | 10 | | | 15 |
| | 11 | | | 16 |
| | 11 | | | 16 |
| | 12 | | | 17 |
| | 12 | | | 17 |
| | 13 | | | 18 |
| | 13 | | | 18 |
| | 14 | | | 19 |
| | 14 | | | 19 |
| | 15 | 1 | 5 | 10 |
| | 15 | 0 | 3 | 0 |
| | 16 | | | 11 |
| | 16 | | | 1 |
| | 17 | | | 12 |
| | 17 | | | 2 |
| | 18 | | | 13 |
| | 18 | | | 3 |
| | 19 | | | 14 |
| | 19 | | | 4 |

| RT | M | C | H |
|---|---|---|---|
| 20 | 1 | 3 | 15 |
| 20 | 1 | 5 | 10 |
| 21 | | | 16 |
| 21 | | | 11 |
| 22 | | | 17 |
| 22 | | | 12 |
| 23 | | | 18 |
| 23 | | | 13 |
| 24 | | | 19 |
| 24 | | | 14 |
| 25 | 2 | 1 | 4 |
| 25 | | | 15 |
| 26 | | | 5 |
| 26 | | | 16 |
| 27 | | | 6 |
| 27 | | | 17 |
| 28 | | | 7 |
| 28 | | | 18 |
| 29 | | | 8 |
| 29 | | | 19 |
| 30 | | | 9 |
| 30 | 1 | 6 | 0 |
| 31 | | | 10 |
| 31 | | | 1 |
| 32 | | | 11 |
| 32 | | | 2 |
| 33 | | | 12 |
| 33 | | | 3 |
| 34 | | | 13 |
| 34 | | | 4 |
| 35 | | | 14 |
| 35 | | | 5 |
| 36 | | | 15 |
| 36 | | | 6 |
| 37 | | | 16 |
| 37 | | | 7 |
| 38 | | | 17 |
| 38 | | | 8 |
| 39 | | | 18 |
| 39 | | | 9 |

| RT | M | C | H |
|---|---|---|---|
| 40 | 2 | 1 | 19 |
| 40 | 2 | 1 | 4 |
| 41 | 0 | 3 | 0 |
| 41 | | | 5 |
| 42 | | | 1 |
| 42 | | | 6 |
| 43 | | | 2 |
| 43 | | | 7 |
| 44 | | | 3 |
| 44 | | | 8 |
| 45 | | | 4 |
| 45 | | | 9 |
| 46 | | | 5 |
| 46 | | | 10 |
| 47 | | | 6 |
| 47 | | | 11 |
| 48 | | | 7 |
| 48 | | | 12 |
| 49 | | | 8 |
| 49 | | | 13 |
| 50 | | | 9 |
| 50 | | | 14 |
| 51 | | | 10 |
| 51 | | | 15 |
| 52 | | | 11 |
| 52 | | | 16 |
| 53 | | | 12 |
| 53 | | | 17 |
| 54 | | | 13 |
| 54 | | | 18 |
| 55 | | | 14 |
| 55 | | | 19 |
| 56 | | | 15 |
| 56 | 2 | 2 | 0 |
| 57 | | | 16 |
| 57 | | | 1 |
| 58 | | | 17 |
| 58 | | | 2 |
| 59 | | | 18 |
| 59 | | | 3 |

| VVV | WWW | MMM | CCC | HHH |
|---|---|---|---|---|
| 0 | 14 | 0 | 2 | 5 |
| 15 | 19 | 0 | 3 | 0 |
| 20 | 29 | 1 | 5 | 10 |
| 30 | 39 | 1 | 6 | 0 |
| 40 | 55 | 2 | 1 | 4 |
| 56 | 60 | 2 | 2 | 0 |

| VVV | WWW | MMM | CCC | HHH |
|---|---|---|---|---|
| 0 | 14 | 0 | 2 | 5 |
| 15 | 24 | 1 | 5 | 10 |
| 25 | 40 | 2 | 1 | 4 |
| 41 | 60 | 0 | 3 | 0 |